US008226862B2

(12) United States Patent
Liu et al.

(10) Patent No.: US 8,226,862 B2
(45) Date of Patent: Jul. 24, 2012

(54) MOLECULAR SIEVE/POLYMER ASYMMETRIC FLAT SHEET MIXED MATRIX MEMBRANES

(75) Inventors: Chunqing Liu, Schaumburg, IL (US); Stephen T. Wilson, Libertyville, IL (US); David A. Lesch, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 20 days.

(21) Appl. No.: 11/954,454

(22) Filed: Dec. 12, 2007

(65) Prior Publication Data

US 2009/0152763 A1    Jun. 18, 2009

(51) Int. Cl.
 *B29D 7/00*   (2006.01)
(52) U.S. Cl. ......................................... 264/45.9; 264/41
(58) Field of Classification Search .................... 264/41, 264/205, 45.9
 See application file for complete search history.

(56) References Cited

U.S. PATENT DOCUMENTS

| | | | | |
|---|---|---|---|---|
| 4,214,020 | A * | 7/1980 | Ward et al. | 427/296 |
| 4,307,135 | A * | 12/1981 | Fox | 427/244 |
| 4,826,599 | A * | 5/1989 | Bikson et al. | 210/500.3 |
| 4,925,459 | A * | 5/1990 | Rojey et al. | 95/50 |
| 4,925,562 | A | 5/1990 | te Hennepe et al. | 210/500.25 |
| 5,127,925 | A | 7/1992 | Kulprathipanja et al. | 55/16 |
| 6,508,860 | B1 | 1/2003 | Kulkarni et al. | 95/51 |
| 6,562,110 | B2 * | 5/2003 | Koros et al. | 96/4 |
| 6,626,980 | B2 | 9/2003 | Hasse et al. | 95/51 |
| 6,663,805 | B1 * | 12/2003 | Ekiner et al. | 264/45.9 |
| 7,048,846 | B2 | 5/2006 | White et al. | 208/208 R |
| 7,109,140 | B2 | 9/2006 | Marand et al. | 502/4 |
| 7,166,146 | B2 | 1/2007 | Miller et al. | 95/45 |
| 2003/0220188 | A1 * | 11/2003 | Marand et al. | 502/60 |
| 2004/0082825 | A1 | 4/2004 | Brown et al. | 585/639 |
| 2005/0043167 | A1 | 2/2005 | Miller et al. | 502/4 |
| 2005/0139065 | A1 | 6/2005 | Miller et al. | 95/45 |
| 2005/0268782 | A1 | 12/2005 | Kulkarni et al. | 96/4 |
| 2006/0117949 | A1 * | 6/2006 | Kulkarni et al. | 95/45 |
| 2007/0022877 | A1 | 2/2007 | Marand et al. | 95/51 |
| 2007/0209514 | A1 * | 9/2007 | Liu et al. | 522/74 |

FOREIGN PATENT DOCUMENTS

KR    2005-0113974    12/2005

OTHER PUBLICATIONS

Vu et al., "Mixed matrix membranes using carbon molecular sieves I. preparation and experimental results" Journal of Membrane Science 211 (2003) p. 311-334.*
Yong et al., J. Membr. Sci., 188: 151 (2001).
Zhu et al., Chem. Mater., 10: 1483 (1998).
Ravishankar et al., J. Phys. Chem., 102: 2633 (1998).
Huang et al., J. Am. Chem. Soc., 122: 3530 (2000).
Yan et al., J. Mater. Chem. 12: 3640 (2002).
Moermans et al., Chem. Commun., 2467 (2000).
Yaghi et al., Science, 295: 469 (2002).
Yaghi et al., Micropor. Mesopor. Mater., 73: 3 (2004).
Dybtsev et al., Angew. Chem. Int. Ed., 43: 5033 (2004).
Yaghi et al., J. Am. Chem. Soc. 123: 4368 (2001).
McKeown et al., Chem. Commun., 2780 (2002).
Budd et al., Adv. Mater., 16: 456 (2004).
McKeown et al., Chem. Eur. J., 11: 2610 (2005).

* cited by examiner

*Primary Examiner* — Christina Johnson
*Assistant Examiner* — Galen Hauth
(74) *Attorney, Agent, or Firm* — Mark Goldberg

(57) ABSTRACT

The present invention discloses an approach for making mixed matrix membranes (MMMs) and methods for using these membranes. These MMMs contain a continuous polymer matrix and dispersed microporous molecular sieve particles. This invention also pertains to control of the thickness of the thin dense selective mixed matrix membrane layer that is equal to or greater than the particle size of the largest molecular sieve particles for making large scale asymmetric MMMs. In particular, the invention is directed to making asymmetric flat sheet MMM by a phase inversion technique. The MMMs of the present invention exhibit at least 20% increase in selectivity compared to the polymer membranes prepared from their corresponding continuous polymer matrices. The MMMs of the present invention are suitable for a variety of liquid, gas, and vapor separations.

11 Claims, No Drawings

MOLECULAR SIEVE/POLYMER ASYMMETRIC FLAT SHEET MIXED MATRIX MEMBRANES

FIELD OF THE INVENTION

This invention pertains to approaches for making molecular sieve/polymer mixed matrix membranes (MMMs) and methods for using these membranes. The MMM prepared in the present invention comprising molecular sieves dispersed in a continuous polymer matrix exhibits a selectivity increase of at least 20% relative to a polymer membrane made from the continuous polymer matrix without molecular sieves.

BACKGROUND OF THE INVENTION

Gas separation processes using membranes have undergone a major evolution since the introduction of the first membrane-based industrial hydrogen separation process about two decades ago. The disclosure of new materials and efficient methods for making membranes will further advance the membrane gas separation processes within the next decade.

The gas transport properties of many glassy and rubbery polymers have been measured as part of the search for materials with high permeability and high selectivity for potential use as gas separation membranes. Unfortunately, an important limitation in the development of new membranes for gas separation applications is a well-known trade-off between permeability and selectivity of polymers. By comparing the data of hundreds of different polymers, Robeson demonstrated that selectivity and permeability seem to be inseparably linked to one another, in a relation where selectivity increases as permeability decreases and vice versa.

Despite concentrated efforts to tailor polymer structure to improve separation properties; current polymeric membrane materials have seemingly reached a limit in the trade-off between productivity and selectivity. For example, many polyimide and polyetherimide glassy polymers such as Ultem® 1000 have much higher intrinsic $CO_2/CH_4$ selectivities ($\alpha_{CO2/CH4}$)(~30 at 50° C. and 690 kPa (100 psig) pure gas tests) than those of polymers such as cellulose acetate (~22), which are more attractive for practical gas separation applications. These polyimide and polyetherimide glassy polymers, however, do not have permeabilities attractive for commercialization compared to current commercial cellulose acetate membrane products. On the other hand, some inorganic membranes, such as SAPO-34 and DDR zeolite membranes and carbon molecular sieve membranes, offer much higher permeability and selectivity than polymeric membranes for separations, but are too brittle, expensive, and difficult for large-scale manufacture. Therefore, it remains highly desirable to provide an alternate cost-effective membrane with improved separation properties compared to the polymer membranes.

Based on the need for a more efficient membrane, a new type of membrane, mixed matrix membrane (MMM), has been developed. MMMs are hybrid membranes containing inorganic particles such as molecular sieves dispersed in a continuous polymer matrix.

MMMs have the potential to achieve higher selectivity and/or greater permeability compared to the existing polymer membranes, while maintaining their advantages such as low cost and easy processability. Much of the research conducted to date on MMMs has focused on the combination of a dispersed solid molecular sieving phase, such as molecular sieves or carbon molecular sieves, with an easily processed continuous polymer matrix. For example, see U.S. Pat. No. 6,626,980; US 2005/0268782; US 2007/0022877; and U.S. Pat. No. 7,166,146. The sieving phase in a solid/polymer mixed matrix scenario can have a selectivity that is significantly larger than the pure polymer. Therefore, in theory the addition of a small volume fraction of molecular sieves to the polymer matrix will significantly increase the overall separation efficiency. Typical inorganic sieving phases in MMMs include various molecular sieves, carbon molecular sieves, and traditional silica. Many organic polymers, including cellulose acetate, polyvinyl acetate, polyetherimide (commercially Ultem®), polysulfone (commercial Udel®), polydimethylsiloxane, polyethersulfone, and several polyimides (including commercial Matrimid®), have been used as the continuous phase in MMMs.

Most recently, significant research efforts have been focused on materials compatibility and adhesion at the inorganic molecular sieve/polymer interface of the MMMs in order to achieve separation property enhancements over traditional polymers. For example, Kulkami et al. and Marand et al. reported the use of organosilicon coupling agent functionalized molecular sieves to improve the adhesion at the sieve particle/polymer interface of the MMMs. See U.S. Pat. No. 6,508,860 and U.S. Pat. No. 7,109,140. This method, however, has a number of drawbacks including: 1) prohibitively expensive organosilicon coupling agents; 2) very complicated time consuming molecular sieve purification and organosilicon coupling agent recovery procedures after functionalization. Therefore, the cost of making such MMMs having organosilicon coupling agent functionalized molecular sieves in a commercially viable scale can be very expensive. Most recently, Kulkami et al. also reported the formation of MMMs with minimal macrovoids and defects by using electrostatically stabilized suspensions. See US 2006/0117949. US 2005/0139065 A1 to Miller et al., entitled "Mixed matrix membranes with low silica-to-alumina ratio molecular sieves and methods for making and using the membranes", reports the incorporation of low silica-to-alumina (Si/Al) ratio molecular sieves into a polymer membrane with a Si/Al molar ratio of the molecular sieves preferably less than 1.0. Miller et al. claim that when the low Si/Al ratio molecular sieves are properly interspersed with a continuous polymer matrix, the MMM ideally will exhibit improved gas separation performance.

While the polymer "upper-bound" curve has been surpassed using solid/polymer MMMs, there are still many issues that need to be addressed for large-scale industrial production of these new types of MMMs. One feature that needs improvement is the excessive thickness of the MMMs. Most of the molecular sieve/polymer MMMs reported in the literature are in the form of thick symmetric mixed matrix dense films with a thickness of about 50 µm and molecular sieve particles with relatively large particle sizes in the micron range have been used. Commercially available polymer membranes, such as cellulose acetate and polysulfone membranes, however, have an asymmetric membrane structure with a less than 500 nm thin dense selective layer supported on a porous non-selective layer. As a consequence, the dense selective layer thickness of the mixed matrix membranes is much thinner than the particle size of the molecular sieve particles. Voids and defects, which result in reduced overall selectivity, are easily formed at the interface of the large molecular sieve particles and the thin polymer matrix of the asymmetric MMMs. Therefore, controlling the thickness of the thin dense selective mixed matrix membrane layer and the particle size of the molecular sieve particles is critical for making large scale asymmetric MMMs with at least 20% increase in selectivity compared to the corresponding asymmetric polymer membranes containing no molecular sieves.

SUMMARY OF THE INVENTION

This invention pertains to novel approaches for making molecular sieve/polymer mixed matrix membranes (MMMs) and methods for using these membranes. This invention also pertains to methods to control the thickness of a thin dense selective mixed matrix layer that is equal to or greater than the particle size of the largest molecular sieve particles for making large scale asymmetric MMMs with at least 20% increase in selectivity compared to the corresponding asymmetric polymer membranes containing no molecular sieves.

The MMMs described in the current invention contain a thin dense selective permeable layer which comprises a continuous polymer matrix and discrete molecular sieve particles uniformly dispersed throughout the continuous polymer matrix. The molecular sieves in the MMMs can produce membranes having a selectivity and/or permeability that is significantly higher than the pure polymer membranes for separations. Addition of a small weight percent of molecular sieves to the polymer matrix, therefore, increases the overall separation efficiency significantly. The molecular sieves used in the MMMs of current invention include microporous and mesoporous molecular sieves, carbon molecular sieves, and porous metal-organic frameworks (MOFs). The microporous molecular sieves are selected from alumino-phosphate molecular sieves such as AlPO-18, AlPO-14, AlPO-53, and AlPO-17, aluminosilicate molecular sieves such as 4A, 5A, UZM-5, UZM-25, and UZM-9, silico-alumino-phosphate molecular sieves such as SAPO-34, and mixtures thereof. The continuous polymer matrix is selected from glassy polymers such as cellulose acetates, cellulose triacetates, polyimides, and polymers of intrinsic microporosity.

This invention is directed to making an asymmetric flat sheet MMM with a selectivity increase of at least 20% compared to the corresponding asymmetric polymer membranes containing no molecular sieves. The MMM is prepared by using a molecular sieve/polymer mixed matrix casting dope by phase inversion technique. This approach comprises: (a) dispersing molecular sieve particles in an organic solvent or a mixture of two or more organic solvents by ultrasonic mixing and/or mechanical stirring or other method to form a molecular sieve slurry; (b) if necessary, dissolving a polymer in the molecular sieve slurry to functionalize the surface of molecular sieve particles; (c) dissolving a polymer or a blend of two polymers that serves as a continuous polymer matrix in the molecular sieve slurry; (d) adding one or more organic solvents that cannot dissolve the polymer matrix to the molecular sieve/polymer slurry and stirring for a sufficient time to form a stable molecular sieve/polymer casting dope; (e) casting a thin layer of the molecular sieve/polymer casting dope on top of a porous fabric support; (f) evaporating the organic solvents for a sufficient time to form a wet MMM with a thin dense selective mixed matrix layer with a thickness equal to or greater than the particle size of the largest molecular sieve particles on the top; (g) dipping the wet MMM into a cold water bath to generate the porous non-selective MMM support layer below the thin dense selective mixed matrix layer by phase inversion; (h) dipping the asymmetric MMM into a hot water bath to remove residue organic solvents in the MMM; and (i) washing and drying the asymmetric MMM.

A membrane post-treatment step can be added after making the asymmetric flat sheet MMM to improve selectivity without changing or damaging the membrane, or causing the membrane to lose performance with time. The membrane post-treatment step can involve coating the selective layer surface of the MMM with a thin layer of material such as a polysiloxane, a fluoro-polymer, a thermally curable silicone rubber, or a UV radiation curable silicone rubber. The asymmetric flat sheet MMM made using this approach contains a thin dense selective mixed matrix layer on a porous non-selective pure polymer or mixed matrix layer.

One important requirement regardless of the method used to make the MMMs prepared in accordance with this invention is to control the minimal thickness of the thin dense selective mixed matrix layer equal to or larger than the particle size of the largest molecular sieve particles dispersed in the polymer matrix.

The MMMs fabricated using the approaches described in the present invention combine the solution-diffusion mechanism of polymer membrane and the molecular sieving and sorption mechanism of molecular sieves, and assure maximum selectivity and consistent performance among different membrane samples comprising the same molecular sieve/polymer composition.

The approaches described herein for producing voids and defects free, high performance MMMs are suitable for large scale membrane production and can be integrated into commercial polymer membrane manufacturing processes.

The invention provides a process for separating at least one gas from a mixture of gases using the MMMs, the process comprising: (a) providing such MMM comprising molecular sieve particles uniformly dispersed in a continuous polymer matrix which is permeable to said at least one gas; (b) contacting the mixture on one side of the MMM to cause said at least one gas to permeate the MMM; and (c) removing from the opposite side of the membrane a permeate gas composition comprising a portion of said at least one gas which permeated said membrane.

The MMMs of the present invention are suitable for a variety of liquid, gas, and vapor separations such as deep desulphurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, olefin/paraffin, iso/normal paraffins separations, and other light gas mixture separations. The MMMs of the present invention have significantly improved selectivity and/or flux for these separations compared to the polymer membranes prepared from their corresponding continuous polymer matrices.

DETAILED DESCRIPTION OF THE INVENTION

This invention pertains to novel approaches for making molecular sieve/polymer mixed matrix membranes (MMMs) and methods for using these membranes. This invention also pertains to methods to control the thickness of the thin dense selective mixed matrix layer equal to or greater than the particle size of the largest molecular sieve particles for making large scale asymmetric MMMs. The MMM prepared in the present invention comprising molecular sieves dispersed in a continuous polymer matrix exhibits a selectivity increase of at least 20% relative to a polymer membrane made from the continuous polymer matrix without molecular sieves.

The MMMs of the current invention are prepared from stabilized molecular sieve/polymer mixed matrix solution (or dope) by controlling the thickness of the thin dense selective mixed matrix membrane layer equal to or greater than the particle size of the largest molecular sieve particles. The term "mixed matrix" as used in this invention means that the membrane has a thin dense selective permeable layer which comprises a continuous polymer matrix and discrete molecular sieve particles uniformly dispersed throughout the continuous polymer matrix. The terms "nano-sized" and "nano-particle" as used in this invention mean that the particle size is ≦500 nm. The term "small pore" refers to molecular sieves which have less than or equal to 8-ring openings in their framework structure.

The MMMs described in the current invention contain a thin dense selective permeable layer which comprises a continuous polymer matrix and discrete molecular sieve particles uniformly dispersed throughout the continuous polymer matrix. The molecular sieves in the MMMs provided in this invention can have selectivity and/or permeability that are significantly higher than the pure polymer membranes for separations. Addition of a small weight percent of molecular sieves to the polymer matrix, therefore, increases the overall separation efficiency significantly. The molecular sieves used in the MMMs of current invention include microporous and mesoporous molecular sieves, carbon molecular sieves, and porous metal-organic frameworks (MOFs).

Molecular sieves improve the performance of the MMM by including selective holes/pores with a size that permits a gas such as carbon dioxide to pass through, but either does not permit another gas such as methane to pass through, or permits it to pass through at a significantly slower rate. The molecular sieves should have higher selectivity for the desired separations than the original polymer to enhance the performance of the MMM. In order to obtain the desired gas separation in the MMM, it is preferred that the steady-state permeability of the faster permeating gas component in the molecular sieves be at least equal to that of the faster permeating gas in the original polymer matrix phase. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves of different chemical compositions can have the same framework structure.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed or replaced without destroying the framework structure. A zeolite composition can be represented by the following formula: $M_{2/n}O:Al_2O_3:xSiO_2:yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers.

Microporous molecular sieve materials are microporous crystals with pores of a well-defined size ranging from about 0.2 to 2 nm. This discrete porosity provides molecular sieving properties to these materials which have found wide applications as catalysts and sorption media. Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Exemplary compositions of such small pore alumina containing molecular sieves include non-zeolitic molecular sieves (NZMS) comprising aluminophosphates (AlPO's), silicoaluminophosphates (SAPO's), metallo-aluminophosphates (MeAPO's), elemental aluminophosphates (ElAPO's), metallo-silicoaluminophosphates (MeAPSO's) and elemental silicoaluminophosphates (ElAPSO's).

To date, almost all of the studies on mixed matrix membranes use large molecular sieve particles with particle sizes in the micron range. See Yong, et al., J. MEMBR. SCI., 188:151 (2001); U.S. Pat. No. 5,127,925; U.S. Pat. No. 4,925,562; U.S. Pat. No. 4,925,459; US 2005/0043167 A1. Commercially available polymer membranes, such as CA and polysulfone membranes, however, have an asymmetric membrane structure with a less than 500 nm thin dense selective layer supported on a porous non-selective layer. As a consequence, the dense selective layer thickness of the asymmetric mixed matrix membranes is much thinner than the particle size of the molecular sieves. Voids and defects, which result in poor mechanical stability and poor selectivity, are easily formed in these asymmetric MMMs. Nano-sized molecular sieves have been developed recently, which leads to the possibility to prepare high selectivity, thin dense selective mixed matrix layer of ≦500 nm. See Zhu, et al., CHEM. MATER., 10:1483 (1998); Ravishankar, et al., J. PHYS. CHEM., 102:2633 (1998); Huang, et al., J. AM. CHEM. SOC., 122:3530 (2000). As an example, Brown et al. reported the synthesis of nano-sized SAPO-34 molecular sieve having a cubic-like crystal morphology with edges of less than 100 nm. See Brown et al., US 2004/0082825 A1 (2004). Vankelecom et al. reported the first incorporation of nano-sized zeolites in thick symmetric mixed matrix membranes by dispersing colloidal silicalite-1 in polydimethylsiloxane polymer membrane. See Moermans, et al., CHEM. COMMUN., 2467 (2000). Homogeneous symmetric thick polymer/zeolite mixed matrix membranes have also been fabricated by the incorporation of dispersible template-removed zeolite A nanocrystals into polysulfone matrix. See Yan, et al., J. MATER. CHEM., 12:3640 (2002).

Some preferred microporous molecular sieves used in the current invention include small pore molecular sieves such as SAPO-34, Si-DDR, UZM-9, AlPO-14, AlPO-34, AlPO-53, AlPO-17, SSZ-62, SSZ-13, AlPO-18, ERS-12, CDS-1, MCM-65, MCM-47, 4A, 5A, UZM-5, UZM-25, AlPO-34, SAPO-44, SAPO-47, SAPO-17, CVX-7, SAPO-35, SAPO-56, AlPO-52, SAPO-43, medium pore molecular sieves such as silicalite-1, and large pore molecular sieves such as NaX, NaY, and CaY.

The microporous molecular sieves used in the current invention are capable of separating mixtures of molecular species based on the molecular size or kinetic diameter (molecular sieving mechanism). The separation is accomplished by the smaller molecular species entering the intracrystalline void space while excluding larger species.

The microporous molecular sieves used in the current invention improve the performance of the MMM by including selective holes/pores with a size that permits a smaller gas molecule to pass through, but does not permit another larger gas molecule to pass through, or permits it to pass through at a significantly slower rate.

Another type of molecular sieves used in the MMMs provided in this invention are mesoporous molecular sieves. Examples of preferred mesoporous molecular sieves include MCM-41, SBA-15, and surface functionalized MCM-41 and SBA-15, etc.

Metal-organic frameworks (MOFs) can also be used as the molecular sieves in the MMMs described in the present invention. MOFs are a new type of highly porous crystalline zeolite-like materials and are composed of rigid organic units assembled by metal-ligands. They possess vast accessible surface areas per unit mass. See Yaghi et al., SCIENCE, 295: 469 (2002); Yaghi et al., MICROPOR. MESOPOR. MATER., 73: 3 (2004); Dybtsev et al., ANGEW. CHEM. INT. ED., 43: 5033 (2004). MOF-5 is a prototype of a new class of porous materials constructed from octahedral Zn—O—C clusters and benzene links. Most recently, Yaghi et al. reported the systematic design and construction of a series of frameworks (IRMOF) that have structures based on the skeleton of MOF-5, wherein the pore functionality and size have been varied without changing the original cubic topology. For example, IRMOF-1 ($Zn_4O(R_1-BDC)_3$) has the same topology as that of MOF-5, but was synthesized by a simplified method. In 2001, Yaghi et al. reported the synthesis of a porous metal-organic polyhedron (MOP) $Cu_{24}(m-BDC)_{24}(DMF)_{14}(H_2O)_{50}(DMF)_6(C_2H_5OH)_6$, termed "α-MOP-1" and constructed from 12 paddle-wheel units bridged by m-BDC to give a large metal-carboxylate polyhedron. See Yaghi et al., J. AM. CHEM. SOC., 123: 4368 (2001). These MOF, IR-MOF and MOP materials exhibit analogous behaviour to that of conventional microporous materials such as large and accessible surface areas, with interconnected intrinsic micropores. Moreover, they may reduce the hydrocarbon fouling problem of the polyimide membranes due to relatively larger pore sizes than those of zeolite materials. MOF, IR-MOF and MOP materials are also expected to allow the polymer to infiltrate the pores, which would improve the interfacial and mechanical properties and would in turn affect permeability. Therefore, these MOF, IR-MOF and MOP materials (all termed "MOF" herein this invention) are used as molecular sieves in the preparation of MMMs in the present invention.

The particle size of the molecular sieves dispersed in the continuous polymer matrix of the MMMs in the present invention is less than or equal to the thickness of the thin dense selective mixed matrix layer. The median particle size should be less than about 10 μm, preferably less than 5 μm, and more preferably less than 1 μm. Most preferably, nano-molecular sieves (or "molecular sieve nanoparticles") should be used in the MMMs of the current invention.

Nano-molecular sieves described herein are sub-micron size molecular sieves with particle sizes in the range of 5 to 500 nm. Nano-molecular sieve selection for the preparation of MMMs includes screening the dispersity of the nano-molecular sieves in organic solvent, the porosity, particle size, and surface functionality of the nano-molecular sieves, the adhesion or wetting property of the nano-molecular sieves with the polymer matrix. Nano-molecular sieves for the preparation of MMMs should have suitable pore size to allow selective permeation of a smaller sized gas, and also should have appropriate particle size in the nanometer range to prevent defects in the membranes. The nano-molecular sieves should be easily dispersed without agglomeration in the polymer matrix to maximize the transport property.

Representative examples of nano-molecular sieves suitable to be incorporated into the MMMs described herein include silicalite-1, SAPO-34, Si-DDR, AlPO-14, AlPO-34, AlPO-53, AlPO-18, SSZ-62, UZM-5, UZM-9, UZM-25, MCM-65, AlPO-17, ERS-12, CDS-1, SAPO-44, SAPO-47, SAPO-17, CVX-7, SAPO-35, SAPO-56, AlPO-52, and SAPO-43.

The MMMs described in the current invention contain a thin dense selective permeable layer which comprises a continuous polymer matrix and discrete molecular sieve particles uniformly dispersed throughout the continuous polymer matrix. The polymer that serves as the continuous polymer matrix in the MMM of the present invention provides a wide range of properties important for separations, and modifying it can improve membrane selectivity. A material with a high glass transition temperature (Tg), high melting point, and high crystallinity is preferred for most gas separations. Glassy polymers (i.e., polymers below their Tg) have stiffer polymer backbones and therefore let smaller molecules such as hydrogen and helium permeate the membrane more quickly and larger molecules such as hydrocarbons permeate the membrane more slowly. For the MMM applications in the present invention, it is preferred that the membrane fabricated from the pure polymer, which can be used as the continuous polymer matrix in MMMs, exhibits a carbon dioxide over methane selectivity of at least about 8, more preferably at least about 15 at 50° C. and 690 kPa (100 psig) pure carbon dioxide or methane testing pressure. Preferably, the polymer that serves as the continuous polymer matrix in the MMM of the present invention is a rigid, glassy polymer. The weight ratio of the molecular sieves to the polymer that serves as the continuous polymer matrix in the MMM of the current invention can be within a broad range from about 1:100 (1 weight part of molecular sieves per 100 weight parts of the polymer that serves as the continuous polymer matrix) to about 2:1 (200 weight parts of molecular sieves per 100 weight parts of the polymer that serves as the continuous polymer matrix) depending upon the properties sought as well as the dispersibility of the molecular sieve particles in the particular continuous polymer matrix.

Typical polymers that serve as the continuous polymer matrix in the MMM can be selected from, but not limited to, polysulfones; sulfonated polysulfones; polyethersulfones (PESs); sulfonated PESs; polyethers; polyetherimides such as Ultem (or Ultem 1000) sold under the trademark Ultem®, manufactured by Sabic Innovative Plastics, poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly(arylene oxide)s such as poly(phenylene oxide) and poly (xylene oxide); poly(esteramide-diisocyanate); polyurethanes; polyesters (including polyarylates), such as poly(ethylene terephthalate), poly(alkyl methacrylate)s, poly (acrylate)s, poly(phenylene terephthalate), etc.; polysulfides; polymers from monomers having alpha-olefinic unsaturation other than mentioned above such as poly(ethylene), poly (propylene), poly(butene-1), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl ester)s such as poly(vinyl acetate) and poly(vinyl propionate), poly(vinyl pyridine)s, poly(vinyl pyrrolidone)s, poly(vinyl ether)s, poly(vinyl ketone)s, poly (vinyl aldehyde)s such as poly(vinyl formal) and poly(vinyl butyral), poly(vinyl amide)s, poly(vinyl amine)s, poly(vinyl urethane)s, poly(vinyl urea)s, poly(vinyl phosphate)s, and poly(vinyl sulfate)s; polyallyls; poly(benzobenzimidazole)s; polybenzoxazoles; polyhydrazides; polyoxadiazoles; polytriazoles; poly(benzimidazole)s; polycarbodiimides; polyphosphazines; microporous polymers; and interpolymers, including block interpolymers containing repeating units from the above such as interpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acryl groups and the like.

Some preferred polymers that can serve as the continuous polymer matrix include, but are not limited to, polysulfones, sulfonated polysulfones, polyethersulfones (PESs), sulfonated PESs, poly(vinyl alcohol)s, polyetherimides such as Ultem (or Ultem 1000) sold under the trademark Ultem®, manufactured by Sabic Innovative Plastics, cellulosic polymers such as cellulose acetate and cellulose triacetate, polyamides, polyimides such as Matrimid sold under the trademark Matrimid® by Huntsman Advanced Materials (Matrimid® 5218 refers to a particular polyimide polymer sold under the trademark Matrimid®), P84 or P84HT sold under the tradename P84 and P84HT respectively from HP Polymers GmbH, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly (3,3',4,4'-diphenylsulfone tetracarboxylic dianhydride-3,3', 5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA)), poly[2,2'-bis-(3,4-dicarboxyphenyl) hexafluoropropane dianhydride-1,3-phenylenediamine] (poly(6FDA-m-PDA)), poly[2,2'-bis-(3,4-dicarboxyphenyl) hexafluoropropane dianhydride-1,3-phenylenediamine-3,5-diaminobenzoic acid)] (poly(6FDA-m-PDA-DABA)), poly (3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly[2,2'-bis-(3,4-dicarboxyphenyl) hexafluoropropane dianhydride-2,2-bis(3-amino-4-hydroxyphenyl)-hexafluoropropane] (poly(6FDA-bis-AP-AF)), polyamide/imides, polyketones, polyether ketones, and polymers of intrinsic microporosity.

The most preferred polymers that can serve as the continuous polymer matrix include, but are not limited to, polyimides such as Matrimid®, P84®, poly(BTDA-PMDA-TMMDA), poly(BTDA-PMDA-ODPA-TMMDA), poly(DSDA-TMMDA), poly(BTDA-TMMDA), poly(6FDA-bis-AP-AF), and poly(DSDA-PMDA-TMMDA), polyetherimides such as Ultem®, polyethersulfones, polysulfones, cellulose acetate, cellulose triacetate, poly(vinyl alcohol)s, polybenzoxazoles, and polymers of intrinsic microporosity.

Microporous polymers (or as so-called "polymers of intrinsic microporosity") described herein are polymeric materials that possess microporosity that is intrinsic to their molecular structures. See McKeown, et al., CHEM. COMMUN., 2780 (2002); Budd, et al., ADV. MATER., 16:456 (2004); McKeown, et al., CHEM. EUR. J., 11:2610 (2005). This type of microporous polymers can be used as the continuous polymer matrix in MMMs in the current invention. The microporous polymers have a rigid rod-like, randomly contorted structure to generate intrinsic microporosity. These microporous polymers exhibit behavior analogous to that of conventional microporous molecular sieve materials, such as large and accessible surface areas, interconnected intrinsic micropores of less than 2 nm in size, as well as high chemical and thermal stability, but, in addition, possess properties of conventional polymers such as good solubility and easy processability. Moreover, these microporous polymers possess polyether polymer chains that have favorable interaction between carbon dioxide and the ethers.

The solvents used for dispersing molecular sieve particles and dissolving the continuous polymer matrix are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, THF, acetone, isopropanol, octane, methanol, ethanol, DMF, DMSO, toluene, dioxanes, 1,3-dioxolane, mixtures thereof, others known to those skilled in the art and mixtures thereof.

This invention is directed to make an asymmetric flat sheet MMM with a selectivity increase of at least 20% compared to the corresponding asymmetric polymer membranes containing no molecular sieves. The MMM is prepared using a molecular sieve/polymer mixed matrix casting dope by phase inversion technique. This approach comprises: (a) dispersing molecular sieve particles in an organic solvent or a mixture of two or more organic solvents by ultrasonic mixing and/or mechanical stirring or other method to form a molecular sieve slurry; (b) dissolving a polymer in the molecular sieve slurry to functionalize the surface of molecular sieve particles; In some cases, this step (b) is not necessary; (c) dissolving a polymer or a blend of two polymers that serves as a continuous polymer matrix in the molecular sieve slurry; (d) adding one or more organic solvents that cannot dissolve the polymer matrix to the molecular sieve/polymer slurry and stirring for a sufficient time to form a stable molecular sieve/polymer casting dope; (e) casting a thin layer of the molecular sieve/polymer casting dope on top of a porous fabric support; (f) evaporating the organic solvents for a sufficient time to form a wet MMM with a thin dense selective mixed matrix layer with a thickness equal to or greater than the particle size of the largest molecular sieve particles on the top; (g) dipping the wet MMM into a cold water bath to generate the porous non-selective MMM support layer below the thin dense selective mixed matrix layer by phase inversion; (h) dipping the asymmetric MMM into a hot water bath to remove the residue organic solvents in the MMM; (i) washing and drying the asymmetric MMM at a sufficient temperature. In some cases a membrane post-treatment step can be added after making the asymmetric MMM to improve selectivity without changing or damaging the membrane, or causing the membrane to lose performance with time. The membrane post-treatment step can involve coating the top surface of the asymmetric MMM with a thin layer of material such as a polysiloxane, a fluoro-polymer, a thermally curable silicone rubber, or a UV radiation curable silicone rubber. The asymmetric flat sheet MMM made using this approach contains a thin dense selective mixed matrix layer supported on a porous non-selective mixed matrix layer.

One requirement for this approach is to control the minimal thickness of the thin dense selective mixed matrix layer equal or larger than the particle size of the largest molecular sieve particles dispersed in the polymer matrix.

The MMMs fabricated using the novel approaches described in the present invention combine the solution-diffusion mechanism of polymer membrane and the molecular sieving and sorption mechanism of molecular sieves, and assure maximum selectivity and consistent performance among different membrane samples comprising the same molecular sieve/polymer composition.

The approaches of the current invention for producing high performance asymmetric flat sheet MMMs is suitable for large scale membrane production and can be integrated into commercial polymer membrane manufacturing processes. The MMMs fabricated by the approaches described in the current invention exhibit at least 20% increase in selectivity compared to the asymmetric polymer membranes prepared from their corresponding polymer matrices.

The invention provides a process for separating at least one gas from a mixture of gases using the MMMs described in the present invention, the process comprising: (a) providing a MMM comprising molecular sieve particles uniformly dispersed in a continuous polymer matrix which is permeable to said at least one gas; (b) contacting the mixture on one side of the MMM to cause said at least one gas to permeate the MMM; and (c) removing from the opposite side of the membrane a permeate gas composition comprising a portion of said at least one gas which permeated said membrane.

The MMMs of the present invention are especially useful in the purification, separation or adsorption of a particular species in the liquid or gas phase. In addition to separation of pairs of gases, these MMMs may, for example, be used for the separation of proteins or other thermally unstable compounds, e.g. in the pharmaceutical and biotechnology industries. The MMMs may also be used in fermenters and bioreactors to transport gases into the reaction vessel and transfer cell culture medium out of the vessel. Additionally, the MMMs may be used for the removal of microorganisms from air or water streams, water purification, ethanol production in a continuous fermentation/membrane pervaporation system, and in detection or removal of trace compounds or metal salts in air or water streams.

The MMMs of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ from natural gas, $H_2$ from $N_2$, $CH_4$, and Ar in ammonia purge gas streams, Ho, recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the MMMs described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases.

The MMMs described in the current invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these MMMs may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The MMMs may incorporate a species that adsorbs strongly to certain gases (e.g. cobalt porphyrins or phthalocyanines for $O_2$ or silver (I) for ethane) to facilitate their transport across the membrane.

These MMMs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using these MMMs is the deep desulfurization of gasoline and diesel fuels by a pervaporation membrane process similar to the process described in U.S. Pat. No. 7,048,846, incorporated by reference herein in its entirety. The MMMs that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using an inventive membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The MMMs may be used for separation of organic molecules from water (e.g. ethanol and/or phenol from water by pervaporation) and removal of metal and other organic compounds from water.

An additional application of the MMMs is in chemical reactors to enhance the yield of equilibrium-limited reactions by selective removal of a specific product in an analogous fashion to the use of hydrophilic membranes to enhance esterification yield by the removal of water.

The MMMs described in the current invention have immediate applications for the separation of gas mixtures including carbon dioxide removal from natural gas. The MMM permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

EXAMPLES

The following examples are provided to illustrate one or more preferred embodiments of the invention, but are not limited embodiments thereof. Numerous variations can be made to the following examples that lie within the scope of the invention.

Example 1

A "Control" poly(DSDA-PMDA-TMMDA)-PES(50:50) (abbreviated as Control 1) polymer membrane was prepared.

3.0 g of poly(DSDA-PMDA-TMMDA) polyimide polymer and 3.0 g of polyethersulfone (PES) were dissolved in a solvent mixture of NMP and 1,3-dioxolane by mechanical stirring for 2 hours to form a homogeneous casting dope. The resulting homogeneous casting dope was allowed to degas overnight. A "Control 1" blend polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form "Control 1".

Example 2

23% AlPO-14/poly(DSDA-PMDA-TMMDA)-PES(50:50) mixed matrix membranes were prepared. A series of 23% AlPO-14/poly(DSDA-PMDA-TMMDA)-PES(50:50) MMMs with different thicknesses and containing 23 wt-% of dispersed AlPO-14 molecular sieve particles (the particle size of AlPO-14≦5 μm, AlPO-14/(AlPO-14+PES+poly(DSDA-PMDA-TMMDA))=23 wt-%) in poly(DSDA-PMDA-TMMDA) polyimide and PES blend continuous polymer matrix were prepared as follows: 1.8 g of AlPO-14 molecular sieve particles were dispersed in a mixture of 11.6 g of NMP and 17.2 g of 1,3-dioxolane by mechanical stirring and ultrasonication for 1 hour to form a slurry. Then 0.6 g of PES was added in the slurry. The slurry was stirred for at least 1 hour to completely dissolve PES polymer. After that, 3.0 g of poly(DSDA-PMDA-TMMDA) polyimide polymer and 2.4 g of PES polymer were added to the slurry and the resulting mixture was stirred for another 2 hours to form a stable casting dope containing 23 wt-% of dispersed AlPO-14 in the continuous poly(DSDA-PMDA-TMMDA) and PES blend polymer matrix. The stable casting dope was allowed to degas overnight.

A series of 23% AlPO-14/poly(DSDA-PMDA-TMMDA)-PES(50:50) MMMs with different thicknesses were prepared on clean glass plates from the bubble free stable casting dope using a casting knife. The thicknesses of the MMMs were controlled by the gap between the bottom surface of the casting knife and the surface of the glass plates. The film together with the glass plate was then put into a vacuum oven. The solvents were removed by slowly increasing the vacuum and the temperature of the vacuum oven. Finally, the membranes were dried at 200° C. under vacuum for at least 48 hours to completely remove the residual solvents to form 23% AlPO-14/poly(DSDA-PMDA-TMMDA)-PES(50:50) MMMs with thicknesses of 72.6 μm (abbreviated as MMM 1), 27.9 μm (abbreviated as MMM 2), 17.8 μm (abbreviated as MMM 3), 12.2 μm (abbreviated as MMM 4), 6.35 μm (abbreviated as MMM 5), and 4.57 μm (abbreviated as MMM 6).

Example 3

$CO_2/CH_4$ separation properties of Control 1, MMM 1, MMM 2, MMM 3, MMM 4, MMM 5, and MMM 6 were determined. The effect of the thickness of 23% AlPO-14/poly(DSDA-PMDA-TMMDA)-PES(50:50) MMMs on their $CO_2/CH_4$ separation performance has been studied. MMMs with six different thicknesses from 72.6 μm to 4.57 μm have been prepared using AlPO-14 molecular sieves with particle size ≦5 μm (table below). These MMMs including MMM 1, MMM 2, MMM 3, MMM 4, and MMM 5 with thicknesses from 72.6 μm to 6.35 μm, which are greater than the largest particle size of AlPO-14 molecular sieve particles, have shown a similar ~40% increase in $\alpha_{CO2/CH4}$ and ~55% increase in $P_{CO2}$ compared to a poly(DSDA-PMDA-TMMDA)-PES blend polymer membrane (Control 1) ($P_{CO2}$=10.9 Barrers and $\alpha_{CO2/CH4}$=23.2) as shown in Table 1. However, MMM 6 with thickness of 4.57 μm, which is less than the largest particle size of AlPO-14 molecular sieve particles, has shown major defects and no $CO_2/CH_4$ selectivity has been observed. These results have demonstrated that MMMs with significantly improved $CO_2/CH_4$ selectivity and $CO_2$ permeability can be prepared using AlPO-14 molecular sieves with particle size less than or equal to the thickness of the dense selective mixed matrix layer of the MMMs.

TABLE 1

Pure gas permeation test results of Control 1, MMM 1, MMM 2, MMM 3, MMM 4, MMM 5, and MMM 6 for $CO_2/CH_4$ separation[a]

| Membrane | $P_{CO2}$ (Barrer)[b] | $\alpha_{CO2/CH4}$ |
|---|---|---|
| Control 1 | 10.9 | 23.2 |
| MMM 1 | 17.2 | 32.9 |
| MMM 2 | 16.8 | 31.4 |
| MMM 3 | 17.0 | 34.7 |
| MMM 4 | 17.6 | 31.0 |
| MMM 5 | 17.0 | 34.4 |
| MMM 5, repeat | 17.3 | 32.9 |
| MMM 6 | leaky | |

[a]Tested at 50° C. under 690 kPa (100 psig) pure gas pressure.
[b]1 Barrer = $10^{-10}$ cm$^3$(STP) · cm/cm$^2$ · sec · cmHg.

Example 4

A "Control" poly(BTDA-PMDA-ODPA-TMMDA)-PES (90:10) asymmetric flat sheet polymer membrane (abbreviated as Control 2) was prepared. 7.2 g of poly(BTDA-PMDA-ODPA-TMMDA) polyimide polymer and 0.8 g of polyethersulfone (PES) were dissolved in a solvent mixture of 14.0 g of NMP and 20.6 g of 1,3-dioxolane by mechanical stirring for 1 hour. Then a mixture of 4.0 g of acetone, 4.0 g of isopropanol, and 0.8 g of octane was added to the polymer solution. The mixture was mechanically stirred for another 3 hours to form a homogeneous casting dope. The resulting homogeneous casting dope was allowed to degas overnight.

A poly(BTDA-PMDA-ODPA-TMMDA)-PES(90:10) film was cast on a non-woven fabric substrate from the bubble free casting dope using a doctor knife with a 10-mil gap. After evaporation for 2 min. at room temperature, the film together with the fabric substrate was gelled by immersing in a DI water bath at 0° to 5° C. for 10 minutes, and then immersed in a DI water bath at 85° C. for another 10 minutes to remove the residual solvents and the water. The resulting wet Control 2 flat sheet asymmetric polymer membrane was dried at 85° C. in an oven to completely remove the solvents and the water. The dry Control 2 flat sheet asymmetric polymer membrane was then coated with a thermally curable silicon rubber solution (RTV615A+B Silicon Rubber from GE Silicons containing 9 wt-% RTV615A and 1 wt-% RTV615B catalyst and 90 wt-% hexane solvent). The RTV615A+B coated membrane was cured at 85° C. for at least 2 hours in an oven to form the final Control 2 flat sheet asymmetric polymer membrane with a dense selective layer thickness of 3.0 μm.

Example 5

A 29% AlPO-14/poly(BTDA-PMDA-ODPA-TMMDA)-PES(90:10) asymmetric flat sheet MMM (abbreviated as MMM 7) was prepared. 4.0 g of AlPO-14 molecular sieves with particle size of 0.5-2.5 μm were dispersed in a mixture of 14.0 g of NMP and 20 g of 1,3-dioxolane by mechanical stirring for 1 hour and then ultrasonication for 20 minutes to form a slurry. Then 1.0 g of PES was added to functionalize AlPO-14 molecular sieves in the slurry. The slurry was stirred for at least 1 hour and then ultrasonicated for 20 minutes to completely dissolve the PES polymer and functionalize the surface of AlPO-14. After that, 9.0 g of poly(BTDA-PMDA-ODPA-TMMDA) polyimide polymer was added to the slurry and the resulting mixture was stirred for another 1 hour. Then a mixture of 5.0 g of acetone, 5.0 g of isopropanol, and 1.0 g of octane was added and the mixture was mechanically stirred for another 2 hours to form a stable MMM casting dope containing 29 wt-% of dispersed AlPO-14 molecular sieves in the continuous poly(BTDA-PMDA-ODPA-TMMDA) and PES blend polymer matrix (weight ratio of AlPO-14/(AlPO-14+poly(DSDA-PMDA-TMMDA)+PES) is 29:100; weight ratio of PES to poly(BTDA-PMDA-ODPA-TMMDA) is 10:90). The stable MMM casting dope was allowed to degas overnight.

An asymmetric flat sheet MMM 7 was prepared by casting a thin layer of the bubble free MMM casting dope on a non-woven fabric substrate using a doctor knife with a 10-mil gap. The thin layer of the MMM casting dope was evaporated for 2 min. and then the thin layer of the MMM casting dope together with the fabric substrate was immersed in a DI water bath at 0° to 2° C. for 10 minutes to create an asymmetric membrane structure by phase inversion, and then immersed in a DI water bath at 85° C. for another 10 min to remove the residual solvents. The resulting wet asymmetric flat sheet membrane was dried at 85° C. in an oven for 2 hours to completely remove the solvents and the water. The dried membrane was then coated with a thermally cross-linkable silicon rubber solution (RTV615A+B Silicon Rubber from GE Silicons) containing 9 wt-% RTV615A and 1 wt-% RTV615B catalyst and 90 wt-% hexane solvent). The RTV615A+B coated membrane was cured at 85° C. for 2 hours in an oven to cross-linked RTV615A+B silicon coating form the final MMM 7 flat sheet asymmetric mixed matrix membrane with a dense selective mixed matrix layer thickness of 3.0 μm.

Example 6

A 29% AlPO-14/poly(BTDA-PMDA-ODPA-TMMDA)-PES(90:10) asymmetric flat sheet MMM (abbreviated as MMM 8) with a thin dense selective mixed matrix layer thickness of 3.1 μm was prepared from poly(BTDA-PMDA-ODPA-TMMDA) and PES blend polymer matrix with 90:10 weight ratio and 29 wt-% of AlPO-14 molecular sieves with particle size of 2-5 μm (weight ratio of AlPO-14/(AlPO-14+poly(DSDA-PMDA-TMMDA)+PES) is 29:100). MMM 8 was prepared using similar procedures as described in Example 5, but the AlPO-14 molecular sieve sample used in MMM 8 has particle size of 2-5 μm.

Example 7

$CO_2/CH_4$ gas separation properties of Control 2, MMM 7 and MMM 8 asymmetric flat sheet membranes prepared in Examples 4, 5, and 6, respectively, were measured at 50° C. under 6900 kPa (1000 psig) mixed feed gas of 10% $CO_2$ in $CH_4$. The asymmetric flat sheet mixed matrix membrane MMM 7 was prepared using the novel method described in the present invention by controlling the formation of a thin dense selective mixed matrix layer with a thickness (3.0 μm) greater than the particle size of the largest AlPO-14 molecular sieve particles (particle size is 0.5-2.5 μm). MMM 8 with a thin dense selective mixed matrix layer thickness (3.1 μm) much less than the particle size of the largest AlPO-14 molecular sieve particles (particle size is 2-5 μm) was prepared for comparison purpose.

The $CO_2$ and $CH_4$ permeances and $CO_2/CH_4$ selectivities of these membranes were determined from high pressure mixed gas measurements under 6900 kPa (1000 psig) mixed gas pressure with 10% $CO_2$ at 50° C. Table 2 summarizes the permeation results. It can be seen from Table 2 that MMM 7 membrane exhibited 33% increase in $\alpha_{CO2/CO4}$ compared to Control 2 membrane under 6900 kPa (1000 psig) pressure at 50° C. MMM 8, however, showed no increase in $\alpha_{CO2/CO4}$ compared to Control 2 membrane under 6900 kPa (1000 psig) pressure at 50° C. These results demonstrated that asymmetric MMMs with more than 20% improvement in $CO_2/CH_4$ selectivity can be prepared using AlPO-14 molecular sieves with the largest particle size less than or equal to the thickness of the thin dense selective mixed matrix layer of the asymmetric MMMs.

TABLE 2

High pressure mixed gas permeation test results for Control 2, MMM 7, and MMM 8 asymmetric flat sheet membranes for $CO_2/CH_4$ separation[a]

| Membrane | $P_{CO2}/l$ (GPU)[b] | $\alpha_{CO2/CH4}$ | $\Delta\alpha_{CO2/CH4}$ |
|---|---|---|---|
| Control 2[a] | 13.4 | 14.2 | 0 |
| MMM 7[a] | 14.8 | 18.9 | 33% |
| MMM 8[a] | 14.7 | 14.3 | 0 |

[a]Tested at 50° C. under 6900 kPa (1000 psig) pressure of $CO_2$ and $CH_4$ mixed gas, 10% $CO_2$.
[b]1 GPU = $10^{-6}$ cm$^3$(STP)/cm$^2$ · sec · cmHg.

The invention claimed is:
1. A process of making asymmetric flat sheet mixed matrix membranes with at least a 20% increase in selectivity compared to an asymmetric polymer membranes prepared from a corresponding polymer matrices, said process consisting of:
  a) dispersing molecular sieve particles in an organic solvent or a mixture of two or more organic solvents to form a molecular sieve slurry;
  b) dissolving a polymer or a blend of two polymers that serves as a continuous polymer matrix in the molecular sieve slurry and dissolving a second polymer in the molecular sieve slurry to functionalize an outer surface of said molecular sieve particles wherein said second polymer is selected from the group consisting of polyethersulfones, sulfonated polyethersulfones, hydroxyl group-terminated poly(ethylene oxide)s, amino group-terminated poly(ethylene oxide)s, or isocyanate group-terminated poly(ethylene oxide)s, poly(esteramide-diisocyanate)s, hydroxyl group-terminated polypropylene oxide)s, hydroxyl group-terminated co-block-poly(ethylene oxide)-poly(propylene oxide)s, hydroxyl group-terminated tri-block-polypropylene oxide)-block-poly(ethylene oxide)-block-polypropylene oxide)s, tri-block-poly(propylene glycol)-block-poly(ethylene glycol)-block-polypropylene glycol) bis(2-aminopropyl ether), polyether ketones, poly(ethylene imine)s, poly(amidoamine)s, poly(vinyl alcohol)s, poly(allyl amine)s, poly(vinyl amine)s, and cellulosic polymers;
  c) adding one or more organic solvents that cannot dissolve the polymer matrix to the molecular sieve/polymer slurry and stirring for a sufficient time to form a stable molecular sieve/polymer casting dope;
  d) casting a thin layer of the molecular sieve/polymer casting dope on top of a porous fabric support;

e) evaporating the organic solvents for a sufficient time to form a wet mixed matrix membrane with a thin dense selective mixed matrix layer with a thickness equal to or greater than the particle size of the largest molecular sieve particles on said top of said porous fabric support;

f) dipping the wet mixed matrix membrane into a cold water bath to generate a porous non-selective mixed matrix support layer below the thin dense selective mixed matrix layer by phase inversion;

g) dipping the asymmetric mixed matrix membrane into a hot water bath to remove residue organic solvents in the mixed matrix membrane; and h) washing and drying the asymmetric flat sheet mixed matrix membrane.

2. The process of claim 1 wherein said molecular sieve particles are characterized by a maximum diameter and said thin dense selective mixed matrix top layer is thicker than said maximum diameter.

3. The process of claim 1 wherein said cellulosic polymers are selected from the group consisting of cellulose acetate, cellulose triacetate, cellulose acetate-butyrate, cellulose propionate, ethyl cellulose, methyl cellulose, and nitrocellulose.

4. The process of claim 1 wherein said second polymer is polyethersulfone.

5. The process of claim 1 wherein said polymer for said continuous polymer matrix is selected from the group consisting of polysulfones; polyetherimides; cellulosic polymers; polyamides; polyimides; polyamide/imides; polyether ketones; poly(ether ether ketone)s, poly(arylene oxides); poly(esteramide-diisocyanate); polyurethanes; poly(benzobenzimidazole)s; polyhydrazides; polyoxadiazoles; polytriazoles; poly(benzimidazole)s; polycarbodiimides; polybenzoxazoles; polyphosphazines; microporous polymers; and mixtures thereof.

6. The process of claim 1 wherein said polymer for said continuous polymer matrix is selected from the group consisting of polysulfone, polyetherimides, cellulose acetate, cellulose triacetate, polyamides, polyimides, P84 or P84HT, poly(3,3',4,4'-benzophenone tetracarboxylic dianhydride-pyromellitic dianhydride-3,3',5,5'-tetramethyl-4,4'-methylene dianiline), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline), poly(3,3',4,4'-diphenylsulfone tetracarboxylic dianhydride-3,3',5,5'-tetramethyl-4,4'-methylene dianiline), poly(3,3',4,4'-benzophenone tetracarboxylic dianhydride-3,3',5,5'-tetramethyl-4,4'-methylene dianiline), poly(3,3',4,4'-diphenylsulfone tetracarboxylic dianhydride-pyromellitic dianhydride-3,3',5,5'-tetramethyl-4,4'-methylene dianiline), poly[2,2'-bis-(3,4-dicarboxyphenyl)hexafluoropropane dianhydride-1,3-phenylenediamine], poly[2,2'-bis-(3,4-dicarboxyphenyl)hexafluoropropane dianhydride-1,3-phenylenediamine-3,5-diaminobenzoic acid)], poly[2,2'-bis-(3,4-dicarboxyphenyl)hexafluoropropane dianhydride-2,2-bis(3-amino-4-hydroxyphenyl)-hexafluoropropane], poly(benzimidazole)s, polybenzoxazoles, and microporous polymers.

7. The process of claim 1 wherein said polymer for said continuous polymer matrix is selected from the group consisting of polyimides, polyetherimides, polyamides, polybenzoxazoles, cellulose acetate, cellulose triacetate, and microporous polymers.

8. The process of claim 1 wherein said molecular sieve is selected from the group consisting of microporous molecular sieves, mesoporous molecular sieves, carbon molecular sieves, and porous metal-organic frameworks.

9. The process of claim 8 wherein said microporous molecular sieves are small pore microporous molecular sieves selected from the group consisting of SAPO-34, Si-DDR, UZM-9, AlPO-14, AlPO-34, AlPO-17, AlPO-53, SSZ-62, SSZ-13, AlPO-18, UZM-25, ERS-12, CDS-1, MCM-65, MCM-47, 4A, 5A, UZM-5, UZM-9, SAPO-44, SAPO-47, SAPO-17, CVX-7, SAPO-35, SAPO-56, AlPO-52, SAPO-43; medium pore microporous molecular sieve silicalite-1; or large pore microporous molecular sieves selected from the group consisting of NaX, NaY, KY, CaY, and mixtures thereof.

10. The process of claim 1 wherein said mixed matrix membrane is used for a separation selected from the group consisting of deep desulfurization of gasoline or diesel fuels, ethanol/water separations, pervaporation dehydration of aqueous/organic mixtures, or gas separations.

11. The process of claim 1 wherein said gas separation comprises separating gases selected from the group consisting of $CO_2/CH_4$, $CO_2/N_2$, $H_2/CH_4$, $O_2/N_2$, olefin/paraffin (e.g. propylene/propane), iso/normal paraffins separations, and other light gas mixture separations.

* * * * *